Patented Jan. 12, 1943

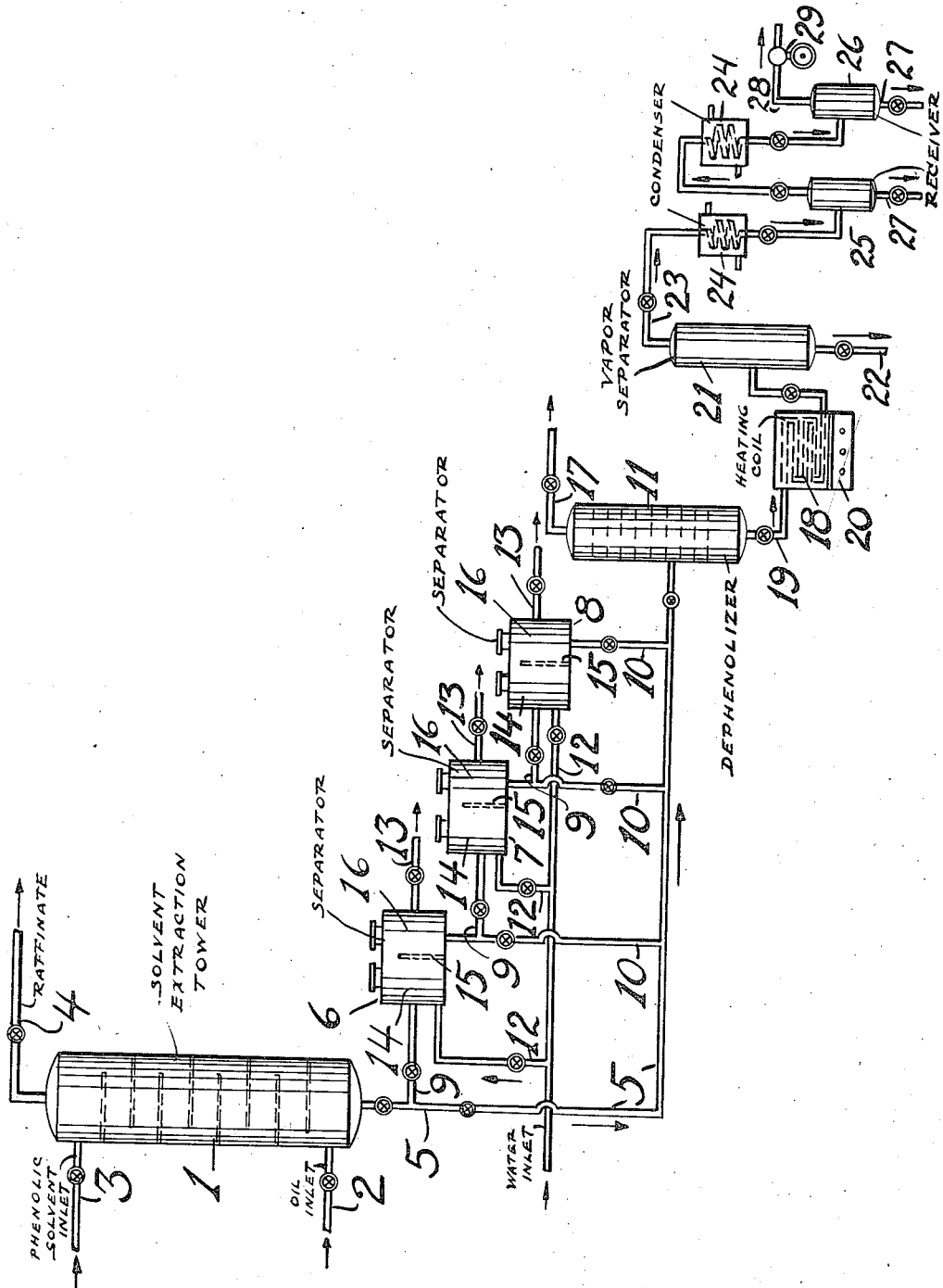

2,307,873

UNITED STATES PATENT OFFICE 2,307,873

PROCESS FOR RECOVERY OF PETROLEUM RESINS

Raymond L. Betts, Elizabeth, N. J., assignor to Standard Oil Development Company, a corporation of Delaware Application November 30, 1940, Serial No. 367,939

2 Claims. (Cl. 196—13)

This invention relates to methods of separating high quality plastic substances known as petroleum resins from petroleum oils. It is concerned particularly with the adjustments in a phenol extraction operation and conjoint treating steps which foster recovery of high quality petroleum resins.

It is known that crude petroleum oils contain complex high boiling substances, including substances termed asphaltenes and those termed resins. These substances are differentiated by their solubilities. In general, the asphaltenes are insoluble in petroleum ether but soluble in benzol; whereas, the resins are highly soluble in petroleum ether. The resins have been considered to be gradually convertible by hydrogen loss or oxidation into the asphaltenes; and they differ greatly in characteristics from light colored and translucent plastic materials to dark colored materials with varying softening points. Those having the lightest color and highest softening points are considered of superior quality, since they are more valuable plastics for many uses, e. g., for making tiles, paints, etc.

Although it has been known that the resins tend to concentrate in selective solvents commercially used for extracting petroleum oils in the manufacture of improved lubricating oils, there have been a number of difficulties in satisfactorily obtaining the high quality resins.

It is the object of this invention to provide a simple and efficient process for segregating and recovering the high quality petroleum resins with the use of phenolic solvents.

I have discovered that in using phenolic solvents for the purpose of obtaining the resins in improved yields and quality that adjustments in the selectivity of the solvent are necessary. In a rather unexpected manner, the desired resins are advantageously concentrated in the extract when the extraction procedure is altered from one used commonly to obtain improved lubricating oils and if the extract is properly treated. Of course, there are a number of variables in the solvent extraction treatment, but the factors having a distinct bearing on the yields of the resins with desired properties are now determined to be the proportions of the solvent and mainly the modification of the solvent with a secondary solvent component like water.

In a solvent extraction treatment with phenol to procure improved high viscosity index lubricating oils, anhydrous phenol or phenol containing a few percent of water, is usually contacted in a major proportion, i. e., in excess of 100%, with the petroleum oil stock at 110° F. to 250° F. in a countercurrent treating tower. The unextracted portion of the oil is the raffinate or improved lubricating oil stock. The extract contains the phenolic solution of low viscosity index oils and asphaltic substances, and ordinarily the extract has been simply dephenolized to recover the phenol solvent.

By investigating the phenol extraction processes used in obtaining improved lubricating oil raffinates, I found that commonly the extracts contained large amounts of oil, and that further processing of these extracts by distillation yielded resins having poor color-softening point relationship. By lowering the proportion of the solvent, and principally by increasing the proportion of water in the solvent, the consistency of the extract phase was increased although the color of the extract considerably darkened, but nevertheless in an unexpected manner, the higher quality resins were concentrated in and could be more advantageously isolated from the extracts of darkened color.

In processing petroleum oil fractions and extracts, to separate therefrom the desired resins, the steps employed in the present invention can be applied with little alteration of the conventional treating plant equipment and with slight additions thereto as will be understood from the following description given with reference to the accompanying drawing, which is a diagrammatic flow plan view of means for suitably carrying out the process.

Referring to the flow diagram, 1 indicates a conventional countercurrent solvent extraction tower, in which a viscous petroleum fraction containing petroleum resins is extracted with a phenolic solvent. The petroleum fraction, for example a Colombian crude distillate having Saybolt viscosity of the order of 190 seconds at 210° F., is led into the extraction tower near the bottom by line 2. The phenolic solvent is led into tower 1 by inlet 3. The raffinate and extract phases are separately removed from the tower, and separately treated thereafter; the raffinate being removed by line 4 and the extract solution being removed by line 5.

The extract solution is passed into a separator 6 by line 9 to be treated for removal of cycle oil or low consistency resin. From separator 6 separated extract of increased consistency is passed serially to one or several successive separators 7, 8, and the like, in each successive separator the extract solution being increased in consistency with separation of lower consistency resin by additions of water. The separated extract solution is passed from one separator to the next by valve controlled line 9. Alternatively, the separated extract solution may be passed directly from the tower 1 by line 5, or from any one of the separators in the series by valve controlled lines 10 and 5 to dephenolizer 11 for recovery of dephenolized resin extract from extract solution.

Each extract solution separator is provided with a valved inlet 12 for the addition of water, so that the extract received from the extraction tower or a preceding separator can be given a controlled adjustment in the water:phenol ratio and thereby effect elimination of lower consistency resin from the extract solution. The lower consistency resin separated from the homogeneous extract solution phase in each separator is withdrawn through outlets 13.

Mixing of the water with the introduced resin extract solution takes place in a mixing zone 14 of each separator. The mixture of the extract and added water overflows baffle 15 into a settling chamber 16, wherein the mixture divides into two liquid layers, the lower and heavier layer being a homogeneous extract solution phase, and the upper, lighter layer containing eliminated lower consistency resin. The heavier resin extract is withdrawn from each settling chamber in the separators through the valved outlets 10 and is forwarded as previously stated either to a succeeding separator or to the dephenolizer.

From any separator, as for example, the final separator 8, the resin extract fraction of increased consistency is passed by lines 10 and 5 to a dephenolizing still 11, wherein phenol and water are distilled off in the still, usually designed as a bubble plate tower, under controlled conditions, for example, under atmospheric pressure with a temperature of about 360° F. or more in the overhead vapors as they leave by the tower outlet 17. In a manner known in the art, the dephenolization may be carried out with various refinements to insure complete removal of phenol, e. g., by further applying vacuum or steam stripping to the resin in auxiliary towers (not shown). Following the dephenolization, the resin is passed to a vacuum pipe still by line 19. The vacuum pipe still includes a heating tube 18 located in furnace 20 and a vapor separator 21, into which the heating tube discharges.

Resin bottoms are withdrawn from the vapor separator 21 through outlet 22 and resin vapors are taken off overhead by outlet 23 at a controlled temperature. The overhead resin vapors are cooled in condensers 24 and collected as one or more fractional distillates in one or several receivers 25, 26, or the like, whence the resins are withdrawn by outlets 27. The receivers are connected by line 28 to a vacuum pump 29.

Low consistency resins separated from the extract solution in any of the separators may be dephenolized and distilled individually or collectively by similar means.

The treatment of the resin extract in a series of steps by controlled additions of water is an advantageous feature for obtaining a number of different grades of resins, also a particularly high grade of resin. Moreover this procedure permits the process to be very flexible for obtaining any desired type of resin while subjecting any type of viscous petroleum distillate to the extraction treatment, and at the same time to obtain by the extraction treatment a desired type of lubricating oil raffinate.

For purposes of illustration, first, are shown results obtained in treating a typical naphthenic Colombian crude distillate of 190 Saybolt viscosity at 210° F. with the proportions of solvent and water varied in the extraction. The extraction treatments were carried out under comparable conditions, in so far as possible, using a countercurrent treating tower, as illustrated, operated at a uniform temperature in the range of about 160 to 170° F., and when necessary with a temperature gradient of about 200 to 140° to maintain an average of about 170° F., in order to prevent separation in the extract phase. The characteristics of the extracts obtained after dephenolizing are compared in the following table.

TABLE I

*Extraction treatment*

| Phenol : water per cent vol. ratio | Solvent: oil | Absolute color | Softening point | Penetration at 77° |
|---|---|---|---|---|
| | Per cent | | °F. | |
| 100: 0 | 200 | 1100 | <70 | |
| 100: 0 | 125 | 1360 | <70 | |
| 100: 0 | 100 | 2180 | 81 | |
| 90:10 | 500 | 2030 | 97 | 179. |
| 95: 5 | 75 | 3840 | 111 | 79. |
| 90:10 | 100 | 3090 | 111 | 50. |
| 90:10 | 200 | 2610 | 117 | 54. |
| 90:10 | 75 | 3430 | 132 | 12. |
| 85:15 | 75 | 5090 | 157 | 9 (at 100°). |
| 70:30 | 80 | 6370 | 185 | 4 (at 115°). |

For the data in the foregoing table, the absolute color determinations were made by dissolving a one-gram sample of the resin into a measured volume of benzol, determining the Tag-Robinson color of the solution, then converting the Tag-Robinson color into the corresponding absolute color on the basis that 1.0 Tag-Robinson color corresponds to 95 absolute color. The softening point was determined by the A. S. T. M. ring and ball softening point method; and the A. S. T. M. method was used for the penetration test, except for the last two penetration tests which were carried out at the higher temperatures indicated, and in the final item, a 100 gram load was used in place of the standard load of 50 grams.

It was seen from data of this type that by lowering the proportion of solvent, and more particularly, by increasing the water content of the solvent, the softening point of the resin extract is markedly improved even though the color of the total extract resin whence it is recovered becomes darkened.

The experiments indicated at a 30% water content in the aqueous phenol solvent within the solvent solution of the extract is about the maximum that can be effectively employed to obtain an optimum yield of the high quality resins which would be present in an undistilled resin extract.

In order to have sufficient commercial value and to justify the expense of their recovery, the petroleum resins should have a softening point of at least 100° F. and an absolute color not higher than about 7,000, because their value is increased as their color number is decreased and their softening point is increased. It is impractical to recover the petroleum resins as such and apart from asphalts if their absolute color substantially exceeds 7,000 and their softening point is below 100° F., because asphalts having absolute colors ranging upwardly from 10,000 can be procured with relatively less difficulty.

It can be readily seen that extracts of the type obtained with a phenol treatment in which the phenol:water percentage volume ratio is greater than about 90:10 are not in themselves of any substantial value. The treatment with anhydrous phenol gave resin extracts having such low softening points that no penetration measurement could be made. In other words, these extracts did not have a resin consistency, but rather they had a consistency of viscous oils. An extract containing resin is obtained with as little as 5% by volume of water in the solvent and the percentage of solvent to the oil treated is less than 100 as is shown in the table. However, the resin in such an extract does not have a satisfactory resistance to penetration. It is further shown in the table that the satisfactory high softening point resins are obtained preferably by increasing the volume percentage of water in the solvent to above 10% and lowering the proportion of the solvent to oil in the treatments with such solvents to below about 200%, more preferably to below 100%.

In order to procure high quality resins of economic value, which are known as pigmentable or translucent plastics, it was found that the relatively dark resinous extracts obtained with the high water:phenol ratio and low solvent to oil treatment constituted the best source of such resins. The high quality, light colored and hard resins having softening points in the range of approximately 100° F. to 200° F. and an absolute color number below 1000 were separated in satisfactory yields from these dark resin extracts, particularly by vacuum distillation.

To compare the quality and yield of resins obtained in distilling the dephenolized extracts, the following data are given:

in obtaining high viscosity lubricating oils can be modified by varying the proportion of water so as to fractionate and segregate the commercial and high quality resins. For example, an undephenolized extract from a 100% anhydrous phenol treated Colombian lubricating oil had a Saybolt viscosity of 872 seconds at 210° F., an absolute color of 2180, and a softening-point of only 81° F., which made this extract of little value as a commercial resin. When this extract was treated with water in varying proportions to segregate the resins, the results obtained were as follows:

TABLE III

| Phenol:water ratio in undephenolized extract | Resin fraction recovered | | |
|---|---|---|---|
| | Absolute color | Softening point, °F. | Penetration at 77° F. |
| 95:5 | 1090 | <70 | |
| 87:13 | 2910 | 104 | 95. |
| 77:23 | 3520 | 128 | 14. |
| 72:28 | 4330 | 147 | 2 (24 at 100° F.). |
| 63:37 | 4380 | 151 | 1 (18 at 100° F.). |
| 55:45 | 4450 | 157 | 1 (10 at 100° F.). |
| Final extract | 5000 | 182 | (7 at 115° F.). |

Likewise the high softening-point fractions of the extract thus obtained can be freed of the solvent and then distilled under vacuum to recover the high quality translucent resins with high softening points.

As in the adjustment of the phenol to water ratio during extraction, it similarly holds, that in adjusting the phenol to water ratio in an extract, addition of water in amounts larger than 30% has limited practicability, because the small increase in the softening-points obtained is at

TABLE II

| Extract distilled | | | Distillation fractions | | | |
|---|---|---|---|---|---|---|
| Treatment source | | | | | | |
| Phenol:water per cent vol. ratio | Solvent/oil per cent vol. | Abs. color | Fraction | Yield wt. per cent of charge | Abs. color | Softening point, °F. |
| 100:0 | 200 | 1100 | I | 55.8 (oil) | 219 | <70 |
| | | | II | 23.2 (oil) | 423 | <70 |
| | | | III (bottoms) | 21.0 | 10400 | 93 |
| 90:10 | 500 | 2030 | I | 61.7 | 392 | 84 |
| | | | II | 37.3 | 5170 | 126 |
| 90:10 | 200 | 2750 | I | 21.0 | 272 | 74 |
| | | | II | 20.2 | 328 | 96 |
| | | | III | 20.6 | 396 | 109 |
| | | | IV | 18.7 | 610 | 118 |
| | | | V | 19.5 | 18900 | 237 |
| 85:15 | 75 | 5090 | I | 30.3 | 633 | 122 |
| | | | II | 20.4 | 1160 | 142 |
| | | | III | 49.3 | 27700 | 241 |
| 70:30 | 80 | 6370 | I | 22.6 | 158 | 100 |
| | | | II | 24.3 | 356 | 136 |
| | | | III | 53.1 (bottoms) | | |

The data in Table II are representative of how the resins of particularly high quality are recovered more effectively from darker resin extracts obtained with relatively lower proportions of solvent and especially with higher concentrations of water in the solvent.

While it has been shown that the proportion of water in the solvent during the extraction treatment is influential in concentrating the desired resins, it is important to note that in the same manner the extracts from the ordinary commercial extraction treatments with phenol the expense of decreased yield. This is illustrated in the following table:

TABLE IV

| Water added to undephenolized extract | Relative yield in volume | Softening point |
|---|---|---|
| | Per cent | °F. |
| 15% | 7.5 | 140 |
| 30% | 3.0 | 156 |
| 60% | 1.6 | 160 |

The final recovery of the high quality resins is preferably obtained with a vacuum distillation step in which the concentrated dephenolized resin is distilled preferably at temperatures ranging from about 450° F. to 700° F., while the resin is kept under a reduced pressure of the order of 0.1 to 10 mm. of mercury absolute.

The distillation step is mainly useful when the initial oil stock is of a naphthenic base type such as comes from coastal and Colombian fields. The resin extracts from these crude oils thus can be readily distilled without causing excessive degradation of the resins.

The extracts obtained from various types of oils, including those obtained from more paraffinic base crudes and residual stocks, may be purified also, with the aid of other treatments, e. g., by acid or clay treatment or by treatment with low-boiling solvents such as propane or butane to remove degraded resins, asphaltenes, and other undesirable asphaltic substances. However, the vacuum distillation is preferred.

In separating resins from residual stocks, it is preferable to remove asphaltenes or non-resinous asphaltic substances from the oil before subjecting it to a phenol extraction. This is accomplished by well-known deasphalting methods, e. g., by treatment with liquid normally gaseous paraffins, e. g., methane, ethane, propane, butane, or mixtures of these.

In fractionating the extract resins, it was found that a small-sized pipe still was very efficient, the resins being heated as they are passed through the heating tube of the pipe still and then being flashed under vacuum; the high quality resins being taken overhead or condensed as a final or intermediate fractional condensate.

A number of the resin products were analyzed for carbon and hydrogen, and it was found that the carbon/hydrogen ratio had a linear relationship to the logarithm of the softening point. There is also some relationship between the carbon/hydrogen ratio and the molecular weight for resins obtained from coastal crudes. Molecular weights were determined to be of an order of from 450 to 700 and higher, and the percentage ratios of carbon/hydrogen were of the order of about 9.0 to 10.0 for a number of higher quality resins obtained by the present process.

It was determined that resin products obtained by the process described can be used in a number of ways. The resins having absolute colors below 6,000, and preferably below 2,000, were satisfactorily utilized in producing high-melting-point resins of satisfactory color by reaction with formaldehyde in the presence of acidic and metal halide condensation catalysts. The resulting products had melting points even higher than 190° F. and absolute colors lower than 6,000.

The general procedure used was to mix the resin with a glacial acetic acid in about 90% by volume and to react the resin in the presence of a catalyst, such as 10% by volume of concentration of sulfuric acid, or 20% by weight of zinc chloride, with formaldehyde e. g., 20% by volume of formalin, refluxing the mixture for a period of several hours. The zinc chloride is less effective than sulfuric acid in treating with the aqueous aldehyde, and is preferably used in a substantially anhydrous reaction mixture. The resin product was separated from the reaction mixture by treating the naphtha, neutralizing with caustic soda, washing with 50% isopropyl alcohol, evaporating the naphtha, and finally distilling under vacuum.

Another very important use of the light colored high melting point resins obtained by the present process is in the preparation of blends with high molecular weight plastic hydrocarbon polymers of the type formed from iso-olefins, mineral or natural waxes and various other resins. The hydrocarbon polymers are obtained in a substantially colorless form. It was found that blending small proportions of the polymers with the resins made a substantial improvement in the softening-point penetration relationship. For example, by blending from 1 to 10% of the polymers with a resin having a softening point of 116, the softening point of the blend was increased from about 3 to 50° F. without substantial change in the penetration.

It is also noteworthy that the described process not only produces higher quality resins characterized by a high softening-point and light color relationship, but, at the same time, yields dark colored residual products, such as are present in the bottoms of the vacuum distillation of the extracts, which despite their dark color are useful when their very high softening points are of chief importance. Hence, as has been demonstrated, the process of the present invention makes it possible to secure the higest grades of petroleum resins and the most useful high softening-point resins from a petroleum oil by a phenol solvent extraction.

As a general rule deduced from the investigations which have been illustrated, the improved separation of resins from petroleum oils with a phenolic solvent is accomplished by having the phenolic solvent to oil ratio in the range of about 75 to 200%, and more particularly by having the phenol to water ratio in the extract phase at least 90:10, and preferably from 90:10 to 70:30.

While the invention has been described with reference to mixtures of water and phenol as the phenolic solvent, other solvent components of similar nature may be used. For example, cresols (alkyl phenols) may be substituted for phenol, and polar compounds which are miscible with water may be substituted in part or whole for the water component. Included among such polar compounds are the lower alcohols, such as methyl alcohol, but these organic polar compounds are not considered as effective as water and would have to be used in somewhat larger proportions, or better, with water, to obtain the desired adjustment of the phenolic solvent in making the desired separation of the resins.

It is to be understood that the foregoing examples are merely illustrative and that various modifications come within the scope of this invention.

I claim:

1. A process for separating high quality petroleum resins having softening points in the range of 100° F. to 200° F. with absolute color below 1,000, while simultaneously segregating extremely high melting point dark colored resins having softening points above 200° F., which comprises treating a petroleum oil containing natural resins with a phenolic solvent to form a raffinate phase and a homogeneous solvent-extract phase, adding to said extract phase sufficient water to bring the ratio of the phenolic component in the solvent to water contained in the extract phase within the approximate limits of from 90:10 to 70:30, separating the extract phase from substances which are not homogeneously contained therein, freeing the extract of the solvent, distilling the solvent-free extract under sufficient vacuum to prevent substantial decomposition, and separating a high quality resin distillate cut.

2. A process for procuring high quality petroleum resins from a petroleum oil, which comprises treating a petroleum oil containing natural petroleum resins with a phenolic solvent to form a raffinate phase and a homogeneous solvent-extract solution, the phenolic solvent being in the proportion of about 75% to 200% of the oil treated, admixing sufficient water with the phenolic solvent in the extract solution to bring the volume percentage proportion of the water to the phenol up to at least 10%, separating oils and low consistency resins which do not remain homogeneously dissolved in the solvent-extract solution, admixing with the homogeneous extract phase further additions of water, and after each addition of the water separating portions of the extract which separate from the solvent solution of the extract, the total additions of water not exceeding substantially 30% by volume of the phenol, removing water and phenol from the final homogeneous extract solution, and distilling said extract at a temperature ranging from 450° F. to 700° F. under vacuum, and condensing as a distillate a high quality petroleum resin.

RAYMOND L. BETTS.